US006526830B2

(12) United States Patent
Scholl et al.

(10) Patent No.: US 6,526,830 B2
(45) Date of Patent: *Mar. 4, 2003

(54) METHOD AND DEVICE FOR MONITORING A BEARING ARRANGEMENT

(75) Inventors: Jürgen Scholl, Schweinfurt (DE); Rüdiger Sontheimer, Schwebheim (DE)

(73) Assignee: SKF GmbH, Schweinfurt (DE)

( * ) Notice: Subject to any disclaimer, the term of this patent is extended or adjusted under 35 U.S.C. 154(b) by 15 days.

This patent is subject to a terminal disclaimer.

(21) Appl. No.: 09/835,579

(22) Filed: Apr. 17, 2001

(65) Prior Publication Data

US 2001/0039835 A1 Nov. 15, 2001

(30) Foreign Application Priority Data

Apr. 19, 2000 (DE) .......................... 100 19 325

(51) Int. Cl.$^7$ ............................................... G01N 29/00
(52) U.S. Cl. .................... 73/593; 73/432.1; 73/579; 73/602
(58) Field of Search .................... 73/593, 599, 600, 73/602, 660, 661, 662, 663, 605, 1.13, 1.15, 659, 432.1, 559; 340/635; 702/35, 36

(56) References Cited

U.S. PATENT DOCUMENTS

| | | | | | |
|---|---|---|---|---|---|
| 4,286,467 A | * | 9/1981 | Kober | ........................... | 73/593 |
| 4,614,117 A | * | 9/1986 | Taniguti | ....................... | 73/659 |
| 4,884,449 A | * | 12/1989 | Nishimoto et al. | ........... | 73/660 |
| 4,941,105 A | * | 7/1990 | Marangoni | ................... | 73/660 |
| 4,980,844 A | * | 12/1990 | Demjanenko et al. | ........ | 73/660 |
| 5,005,417 A | * | 4/1991 | Kawasaki et al. | ............ | 73/593 |
| 5,423,218 A | * | 6/1995 | Matsuzaki | .................... | 73/593 |
| 5,663,894 A | * | 9/1997 | Seth et al. | .................... | 73/654 |
| 5,677,488 A | * | 10/1997 | Monahan et al. | ............. | 73/593 |
| 5,955,670 A | * | 9/1999 | Goodman et al. | ............ | 73/592 |
| 6,053,047 A | * | 4/2000 | Dister et al. | .................. | 73/593 |
| 6,070,325 A | * | 6/2000 | Myata et al. | ............ | 29/898.09 |
| 6,122,966 A | * | 9/2000 | Goodman et al. | ............ | 73/593 |
| 6,161,962 A | * | 12/2000 | French et al. | ................. | 384/459 |
| 6,257,066 B1 | * | 7/2001 | Chandler et al. | ............. | 73/660 |
| 6,260,604 B1 | | 7/2001 | Lippold et al. | ............. | 164/454 |
| 6,289,735 B1 | * | 9/2001 | Dister et al. | .................. | 73/579 |
| 6,297,742 B1 | * | 10/2001 | Canada et al. | ............. | 340/635 |
| 6,321,602 B1 | * | 11/2001 | Ben-Romdhane | ............ | 73/660 |
| 6,339,961 B1 | * | 1/2002 | Goodman et al. | ............ | 73/593 |

FOREIGN PATENT DOCUMENTS

| | | |
|---|---|---|
| DE | 198 29 605 C1 | 10/1999 |
| EP | 0 493 790 A2 | 7/1992 |

\* cited by examiner

*Primary Examiner*—Hezron Williams
*Assistant Examiner*—Jacques M Saint-Surin
(74) *Attorney, Agent, or Firm*—Burns, Doane, Swecker & Mathis, L.L.P.

(57) ABSTRACT

A method and a device for monitoring a bearing arrangement, having at least one bearing, in a mounting element of a roller journal bearing of a roller in a stand of a rolling mill train are designed to initiate upkeep or repair work on the bearing arrangement at the correct time. The method involves measuring a process quantity at the bearing or in an area adjoining the bearing, providing an evaluation device with the measured value of the process quantity, comparing the measured value with a stored preset value, and triggering a signal as soon as the measured value exceeds or falls below the stored preset value.

27 Claims, 3 Drawing Sheets

METHOD AND DEVICE FOR MONITORING A BEARING ARRANGEMENT

This application is based on and claims priority under 35 U.S.C. §119 with respect to German Application No. P 100 19 325.0 filed on Apr. 19, 2000, the entire content of which is incorporated herein by reference.

FIELD OF THE INVENTION

The invention relates to bearing arrangements. More particularly, the present invention pertains to a device and method for monitoring a bearing arrangement, having at least one bearing, in a mounting element of a roller journal bearing of a roller (e.g., a support, intermediate or work roller) in a stand (e.g., a dual, quadruple or sextuple stand) of a rolling mill train.

BACKGROUND OF THE INVENTION

A rolling mill train, preferably for rolling out metallic material, is primarily comprised of several roller frames, with the goods to be milled being passed between at least two rollers. The rollers have a journal at each of their two ends, and the journal is seated in a so-called mounting element. The mounting element represents the housing supporting the roller, with a bearing arrangement being provided between the roller journal and the mounting element.

The quality of the rolling process, as well as its efficiency, is generally determined by the ability of the bearing arrangement to function. It is necessary here to ensure that no bearing damage occurs over time. This can be accomplished through use of preventive maintenance at fixed intervals of time.

However, performing preventative maintenance at specified time intervals invariably results in the performance of preventive maintenance at times when the bearing does not necessarily require such maintenance.

A need thus exists for a method and associated device for monitoring a bearing arrangement of a support, intermediate or work roller in a rolling mill train in a way that makes it possible to control the upkeep, maintenance and/or restoration of the bearing arrangement, as well as its surroundings, in such a way that the upkeep, maintenance and/or restoration is generally only actually triggered when there is a real need.

SUMMARY OF THE INVENTION

In accordance with one aspect of the invention, a method of monitoring a bearing arrangement having at least one bearing in a mounting element of a roller journal bearing involves measuring a process quantity at the bearing or in an area adjoining the bearing, providing an evaluation device with the measured value of the process quantity, comparing the measured value with a stored preset value, and triggering a signal when the measured value exceeds or falls below the stored preset value.

The present invention is thus based on the discovery that a process quantity associated with a roller journal bearing in a roller in a rolling mill train is characteristic of the roller journal bearing's ability to function, or of the operational dependability of the roller journal bearing. By monitoring or measuring the process quantity through use of a suitable sensor, the value of the process quantity can be compared, preferably on a permanent and ongoing or continual basis, with a maximum or minimum threshold value which has been stored in a memory as a marginal threshold value required for the orderly operation of the bearing arrangement. Through comparison of the actual value with the nominal or threshold value, it is possible to trigger or initiate a signal when a permissible tolerance range is exceeded, thus providing the operator of the rolling mill train with a warning that maintenance or replacement work on the respective roller journal bearing, or its surroundings, is necessary.

In accordance with one version of the present invention, the process quantity that is monitored is the force acting on the bearing. This can include the force acting in the axial direction of the bearing and/or the force acting in the radial direction of the bearing. Various force measuring bearings for measuring these forces are known in the art and used in other contexts. The stored threshold value for the maximum possible bearing force would be of such a magnitude that a response of the monitoring system, i.e., the triggering of a signal, occurs if, for example, forces act on the roller bearing reach an inadmissible magnitude. This could be due to, for example, wear in the vicinity of the bearing or could be due to other irregularities such as a tilted roller positioning in the stand.

Further, as an alternative to monitoring the force acting on the bearing, or in addition to monitoring such force, the monitored process quantity can be the moisture in the bearing, or the moisture content of the lubricant in the bearing. It has been found that bearing damage occurs if an inadmissibly high amount of moisture is contained in the bearing. It is thus possible through use of a moisture sensor to measure and monitor the moisture at suitable positions of the bearing or in the surroundings of the bearing. The monitored or measured value of the moisture can then once again be compared to a stored threshold value so that if the monitored or measured value exceeds the stored value, a signal or warning is issued indicating that maintenance or replacement work on the respective roller journal bearing, or its surroundings, is required.

It is further possible as an alternative to, or in addition to, monitoring the force acting on the bearing and/or the moisture as described above, to monitor or measure the temperature prevailing in the bearing. In this connection the temperature of the outer ring is primarily considered because it can be measured in a relatively simple manner.

As an alternative to or in addition to one or more of the process quantities mentioned above, the process quantity on which monitoring is based can be the elastic or plastic deformation of the mounting element. In this case, the deformation can be maintained or measured in the circumferential direction of the mounting element, which thus provides a value indicating the ovalness of the mounting element, or can be measured in the axial direction of the mounting element. In the latter case the cylindrical characteristics of the mounting element is monitored. The deformation of the mounting element to be measured here typically occurs in the form of a superimposition of elastic, and of possibly present plastic deformation. It has been found that when defined threshold values of the deformation of the mounting element are reached, the service life of the bearing is clearly reduced. Thus, monitoring the deformation of the mounting element provides a reliable indication of a required repair or restoration of the mounting element.

As an alternative to or in addition to one or more of the process quantities mentioned above, the process quantity that is measured or monitored can be the vibration amplitude and/or vibration frequency of a preset area of the bearing. It is also possible to measure or monitor the vibration acceleration of a selected area of the bearing. Monitoring the vibration property of a bearing, and preferably the statistical evaluation thereof (amplitudes, frequencies, accelerations) can be used as an indicator for deciding when it is necessary to service, or replace, the bearing.

In accordance with the various aspects of the present invention described above, it is envisioned that the measured or monitored value can be transmitted in a wireless manner. In this regard, the transmission can take place by infrared signals, induction or radio waves.

According to another aspect of the invention, a device for monitoring a bearing arrangement having at least one bearing in a mounting element of a roller journal bearing includes at least one sensor which determines a process quantity at a bearing or in an area surrounding the bearing, a mechanism for conducting the measured value of the process quantity to an evaluation device, a mechanism for comparing the measured value with a stored preset value, and a mechanism for triggering a signal whenever the measured value exceeds or falls below the stored preset value.

Depending on the type of parameter(s) to be monitored, a force sensor, a moisture sensor, a temperature sensor, a deformation sensor (preferably in the form of one or several wire strain gauges) and/or a velocity or acceleration sensor, can be employed for monitoring the process quantity or parameter in question at the bearing.

Although not limited in this regard, the bearing is preferably a rolling bearing, a multi-row tapered roller bearing or a multi-row cylindrical roller bearing.

In accordance with a further development of the invention, the mechanism for conducting the measured value of the process quantity to the evaluation device transmits the measured value in a wireless manner, for example by induction or radio.

Thus, through implementation of the present invention, it is possible to monitor various process quantities or parameters at a roller journal bearing of a roller in a rolling mill train, and to draw specific conclusions regarding when it is necessary to take measures for servicing or replacing the bearing. This makes it possible to initiate suitable activities at the right moment for performing replacement of the bearing arrangement at the start of bearing damage. Optimization of the entire production process in the rolling mill train can thus be realized. The same applies to the mounting element (e.g., the housing) itself and the area surrounding the mounting element in the roller stand. Here too it is possible by way of the described actions to assure that a replacement part is installed at the right time. Wear in the area of the roller journal bearing can be made relatively noticeable by measuring and monitoring the process quantities in question, and it can be automatically indicated at the correct time that maintenance work is required. This means that an increased dependability with respect to unplanned outages can be realized, as well as the possibility of directly identifying the source(s) of malfunctions.

According to another aspect of the invention, a stand in a rolling mill train includes a plurality of rollers each provided with a roller journal, a bearing arrangement supporting the roller journal of at least one roller and comprising at least one bearing, at least one sensor which monitors a value of a process quantity at the bearing or in an area surrounding the bearing, a comparing device that compares the measured value of the process quantity with a stored preset value, and a device for triggering a signal when the measured value exceeds or falls below the stored preset value.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
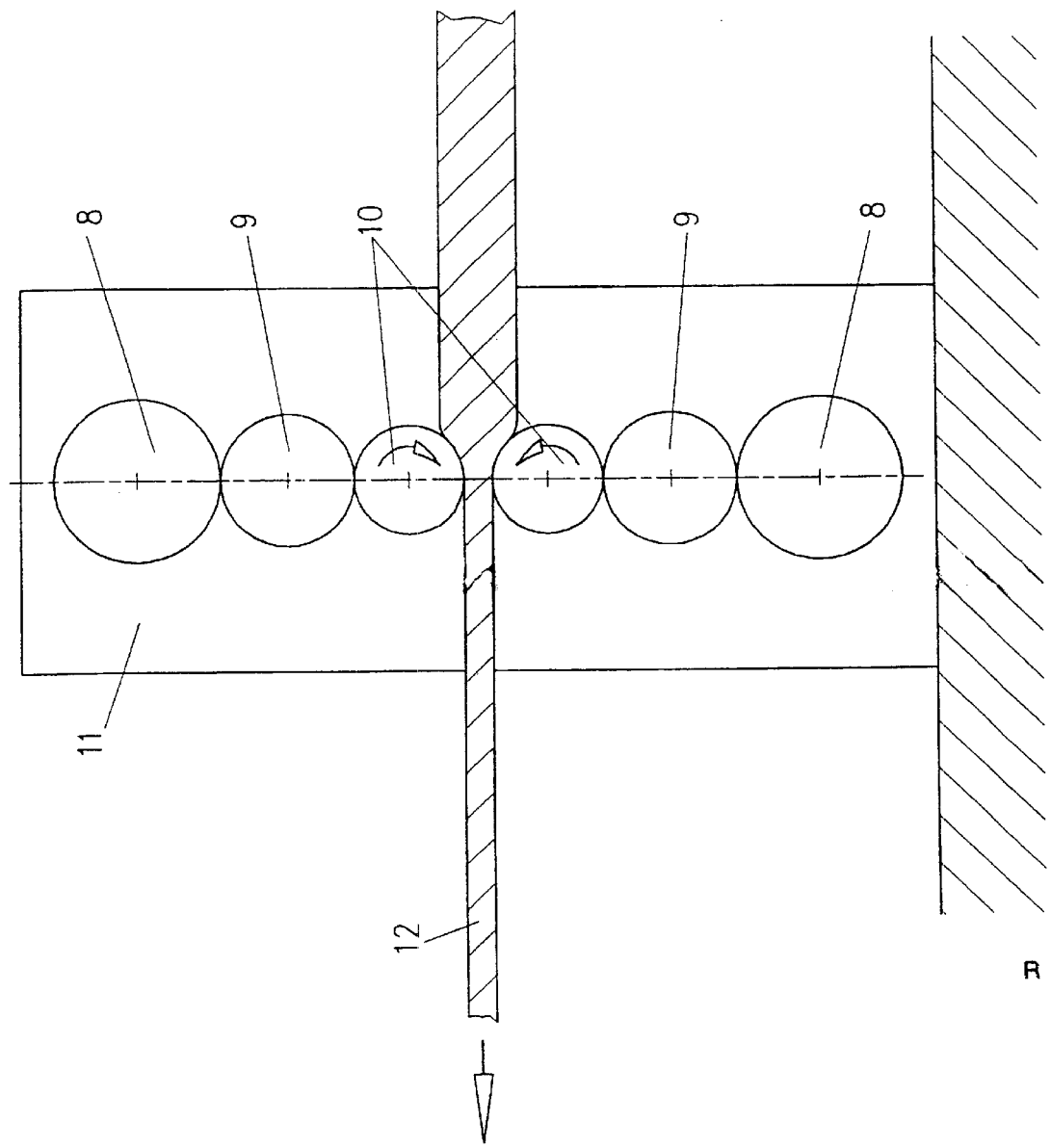
FIG. 1 is a schematic cross sectional view of a sextuple stand of a rolling mill train.

FIG. 1 illustrates a sextuple stand 11 in a rolling mill train for rolling a material 12 that is to be milled. The material 12 to be milled is transported in the direction of the leftward directed arrow. The stand 11 has a total of six rollers or work rollers 8, 9, 10 which roll off on each other, or on the material 12 to be milled. In the illustrated embodiment, the work rollers 10 which engage and roll the material 12 are in contact with the intermediate rollers 9, which in turn work together with the support rollers 8.

Figure 2:
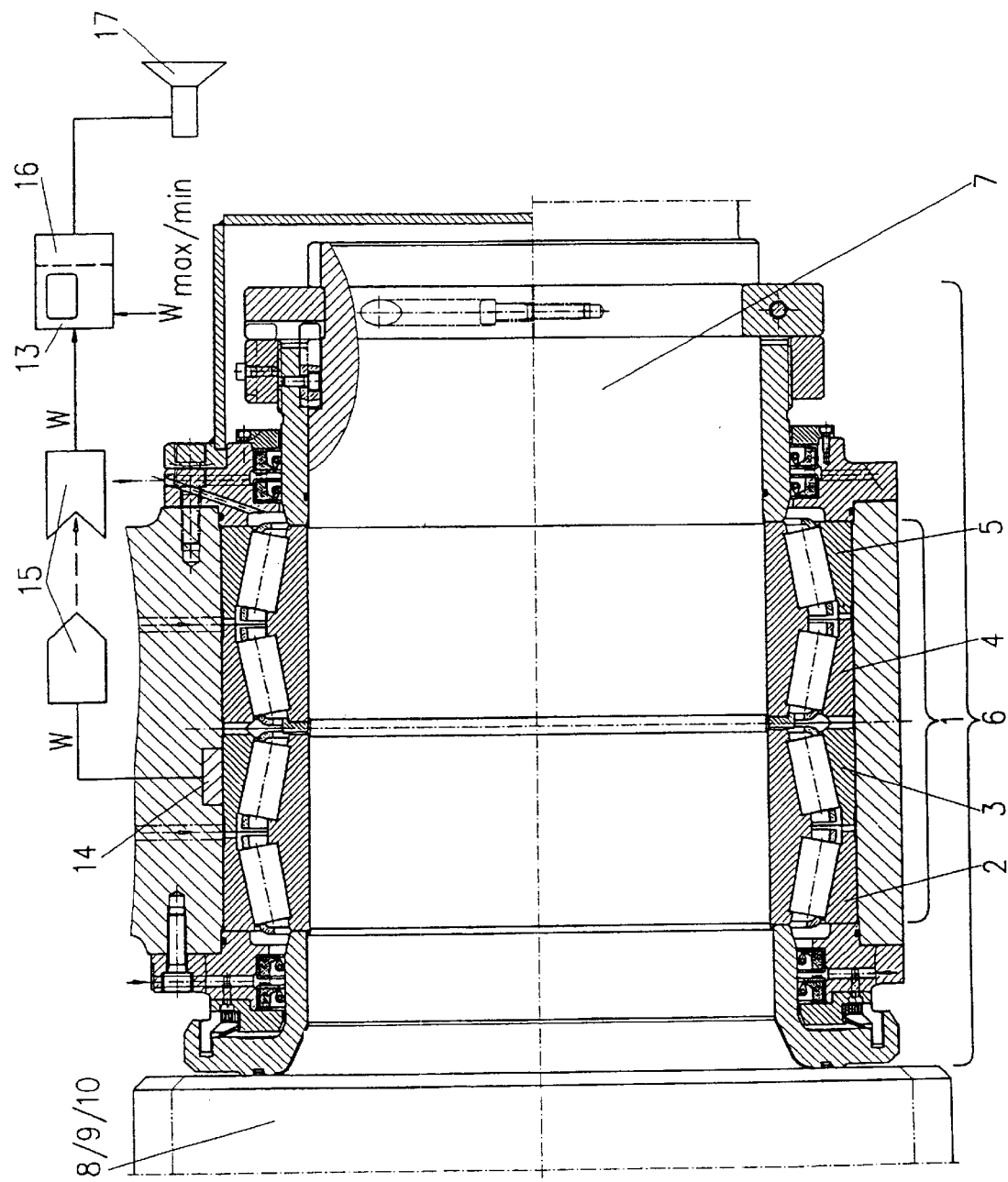
FIG. 2 is a cross-sectional view of a roller journal bearing and various elements used for monitoring.

FIG. 2 shows the end of one of the rollers 8, 9, 10 with its associated roller journal 7. The roller journal 7 is seated in a mounting element 6 which is in the form of a housing. A bearing arrangement 1 is provided for seating. In the illustrated version, the bearing arrangement 1 is a bearing with four bearing rows 2, 3, 4, 5.

As illustrated in FIG. 2, a sensor 14 is integrated into the bearing arrangement 1 and/or the mounting element 6 at a suitable location. The sensor can be in one of several forms, depending upon the process quantity(s) or parameter(s) to be measured or monitored. One possibility is a force sensor. Here, a force-measuring bearing can be equipped with a force sensor. It is also possible, as an alternative to or in addition to the force sensor, to integrate moisture and/or temperature sensors into the bearing. In the same way it is also possible, as an alternative to or in addition to one or more of the sensors mentioned above, to detect the deformation of the bearing arrangement by an appropriate arrangement and connection of wire strain gauges. Finally, acceleration or distance sensors can be integrated into the bearing for recording vibrations, once again as an alternative to or in addition to one or more of the various sensors mentioned above. It is thus envisioned that the various sensors mentioned above can be used individually or can be employed in any desired combinations, depending upon the process quantities or parameters to be measured. Suitable sensors to be employed in the present invention for measuring or monitoring the process quantities or parameters mentioned above are known in the art and are thus not described in detail here.

The sensor 14 conducts or sends a value indicative of the detected process quantity or parameter W to an evaluation device 13. Appropriate mechanisms 15 for conducting the measured or detected value are employed for this purpose. The dashed arrow in FIG. 2 indicates that the transmission of the value of the process quantity W can also take place in a wireless manner, for example by radio waves, infrared signals, or induction.

In addition to the measured value of the process quantity W, the evaluation device 13 also receives a stored preset value $W_{max/min}$ that is related to the measured or detected process quantity. A suitable comparator 16 forming a comparing device compares the measured value W with the preset value $W_{max/min}$ and determines whether the measured value W (actual value) is within the permissible tolerance range (nominal value). That is, the comparator 16 determines whether the measured value W is less than a permissible maximum value, or is greater than a permissible minimum value. In most cases, the measured value will be compared with a preset maximum value for force, moisture, temperature or deformation as the maximum value will likely be of most importance.

If the preset tolerance range, or the preset minimum/maximum value, for the measured process quantity is exceeded, a mechanism 17 causes the triggering or output of a signal. This can take place in a variety of different ways, for example by indicator lights or by acoustical signals. The signal informs or notifies the operator(s) of the rolling mill train that permissible operating parameters have been exceeded. With this information, it is then possible to initiate maintenance work at the bearing to avoid loss of the bearing.

As mentioned above, one possible sensor which can be employed in the present invention is a suitable force sensor for measuring or monitoring the force acting on the bearing. The force to be measured or monitored can be the force acting in the bearing axial direction and/or the force acting in the bearing radial direction. The stored threshold value for the maximum possible bearing force would be of such a magnitude that a response of the monitoring system, i.e., the triggering of a signal, occurs if, for example, forces act on the roller bearing reach an inadmissible magnitude. This could be due to, for example, wear in the vicinity of the bearing or could be due to other irregularities such as a tilted roller positioning in the stand.

As mentioned above, the sensor can also be selected to measure or monitor the moisture in the bearing, or the moisture content of the lubricant in the bearing. Experience has shown that bearing damage can occur if an inadmissibly high amount of moisture is contained in the bearing. A suitable moisture sensor can thus be used to measure and monitor the moisture at suitable positions of the bearing or in the surroundings of the bearing. The monitored or measured value of the moisture is then compared to a stored threshold value so that if the monitored or measured value exceeds the stored value, a signal or warning is issued indicating that maintenance or replacement work on the respective roller journal bearing, or its surroundings, is required.

As mentioned above, a further type of sensor which can be employed in the present invention involves a sensor for measuring or monitoring the temperature prevailing in the bearing. The temperature of the outer ring is one preferred area of temperature measurement because the outer ring temperature can be measured in a relatively simple manner.

A further type of sensor mentioned above is a sensor that measures or monitors the elastic or plastic deformation of the mounting element. The deformation can be measured in the circumferential direction of the mounting element to thus provide a value indicating the ovalness of the mounting element, or can be measured in the axial direction of the mounting element to provide a value indicating the axial or cylindrical characteristics of the mounting element. The deformation of the mounting element to be measured here typically occurs in the form of a superimposition of elastic, and possibly present plastic deformation. Experience has shown that when defined threshold values of the deformation of the mounting element are reached, the service life of the bearing is reduced. Thus, monitoring the deformation of the mounting element provides a reliable indication that a repair or restoration of the mounting element is required.

Another type of sensor which can be employed is one that measures or monitors the vibration amplitude and/or vibration frequency of a preset area of the bearing. It is also possible to monitor the vibration acceleration of a selected area of the bearing. Monitoring or measuring the vibration property of a bearing, including the statistical evaluation of the vibration property (amplitudes, frequencies, accelerations) can be used to indicate when it is necessary to service or replace the bearing.

The present invention is described and illustrated in the context of a roller having a journal at its end, as is often the case, which is seated by way of the bearing arrangement. However, as an alternative, the roller can be provided with an interior bore in both of its end areas, into each of which a journal projects, which is attached to the housing. In this alternative, the bearing would arranged between this journal and the cylindrical interior face of the bore.

The present invention provides a method and device for measuring or monitoring one or more process quantities or parameters associated with a roller journal bearing in a roller in a rolling mill train, preferably through use of one or more appropriate sensors. These process quantity(s) or parameter (s) are indicative of the functioning of the roller journal bearing, or the operational dependability of the roller journal bearing. The value of the measured or monitored process quantity can then be compared with a maximum or minimum threshold value stored in a memory as the marginal threshold value required for the orderly or proper operation of the bearing arrangement. Through comparison of the actual value and the nominal or threshold value, it is possible to initiate a signal when a permissible tolerance range is exceeded, thus providing the operator of the rolling mill train with a warning that maintenance or replacement work on the respective roller journal bearing, or its surroundings, is required.

Figure 3:
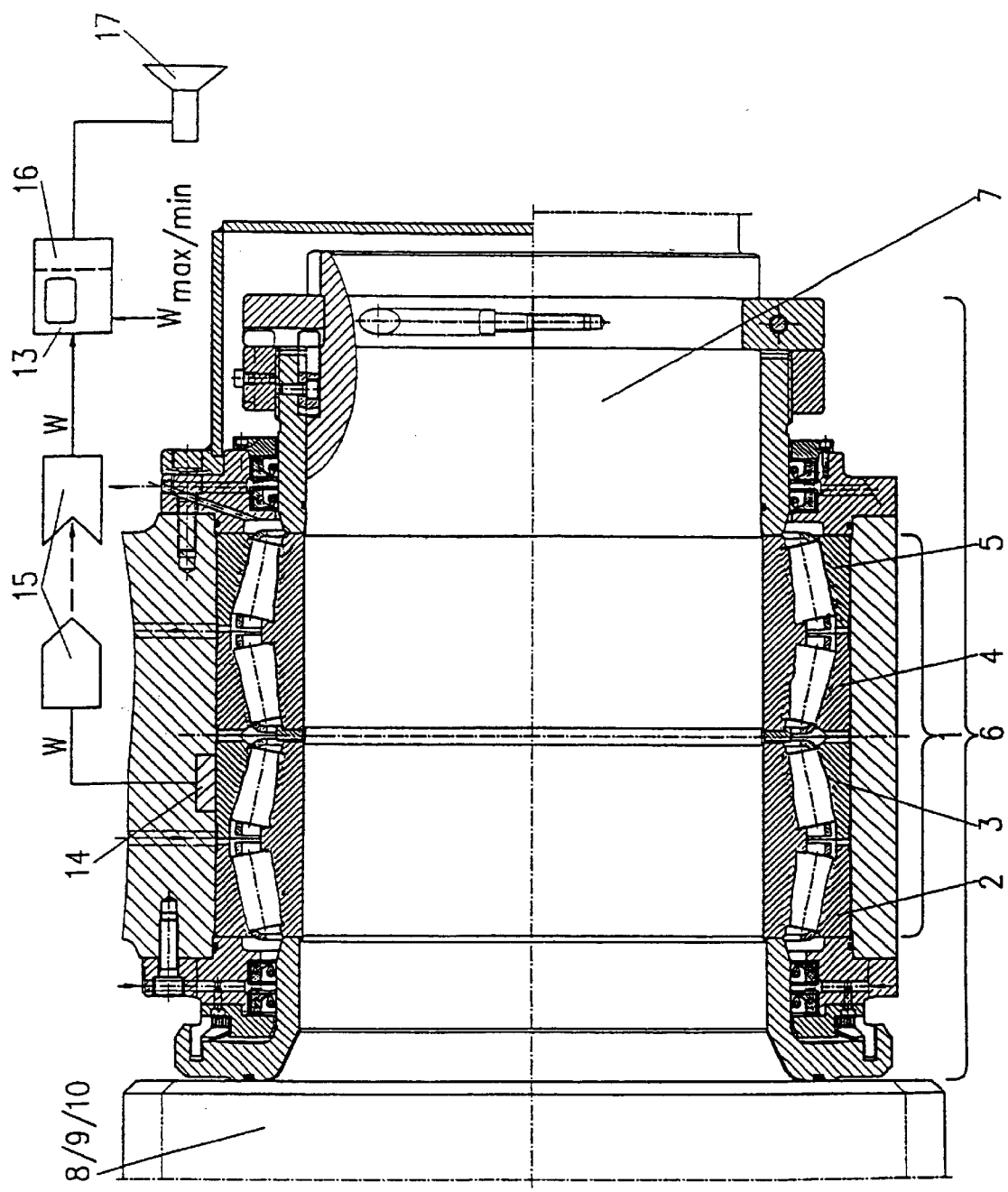
FIG. 3 is a cross-sectional view similar to FIG. 2 illustrating a multi-row tapered roller bearing embodying the present invention.

It is to be understood from the illustration in FIG. 2 that the method and device of the present invention for measuring and monitoring a bearing arrangement is applicable to the support roller, the intermediate roller and/or the work roller of the sextuple stand of the rolling mill train. The present invention is also applicable to dual or quadruple stands of a rolling mill train. Also, the bearing can be a rolling bearing, a multi-row tapered roller bearing as shown in FIG. 3 or a multi-row cylindrical roller bearing as shown in FIG. 2.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A method for monitoring a bearing arrangement in a stand in a rolling mill train that mills metal, the stand including a plurality of rollers, at least one of the rollers provided with a roller journal seated in a mounting element by way of said bearing arrangement, the bearing arrangement having at least one bearing, the method comprising:

measuring a value of a process quantity at the bearing or the mounting element by way of a sensor mounted in the bearing arrangement or the mounting element;

providing the measured value of the process quantity to an evaluation device;

comparing the measured value of the process quantity with a stored preset value; and triggering a signal when the measured value of the process quantity exceeds or falls below the stored preset value.

2. The method in accordance with claim 1, wherein the measurement of the value of the process quantity includes measuring a force acting on the bearing.

3. The method in accordance with claim 2, wherein the force acting on the bearing is the force acting in an axial direction of the bearing.

4. The method in accordance with claim 2, wherein the force acting on the bearing is the force acting in the radial direction of the bearing.

5. The method in accordance with claim 1, wherein the measurement of the value of the process quantity includes measuring moisture present in the bearing or measuring moisture content of lubricant for the bearing.

6. The method in accordance with claim 1, wherein the measurement of the value of the process quantity includes measuring a temperature prevailing in the bearing.

7. The method in accordance with claim 1, wherein the measurement of the value of the process quantity includes measuring a temperature prevailing in an outer ring of the bearing.

8. The method in accordance with claim 1, wherein the measurement of the value of the process quantity includes measuring at least one of an elastic deformation of the mounting element and a plastic deformation of the mounting element.

9. The method in accordance with claim 8, wherein the deformation of the mounting element is measured in a circumferential direction of the mounting element.

10. The method in accordance with claim 8, wherein the deformation of the mounting element is measured in an axial direction of the mounting element.

11. The method in accordance with claim 1, wherein the measurement of the value of the process quantity includes measuring at least one of a vibration amplitude of a preset area of the bearing and a vibration frequency of a preset area of the bearing.

12. The method in accordance with claim 1, wherein the measurement of the value of the process quantity includes measuring a vibration acceleration of a preset area of the bearing.

13. The method in accordance with claim 1, wherein the measured value is transmitted in a wireless manner.

14. The method in accordance with claim 13, wherein the wireless transmission takes place by way of infrared signals.

15. The method in accordance with claim 13, wherein the wireless transmission takes place by way of radio waves.

16. A rolling mill train which mills metal, comprising:

a stand comprised of a plurality of rollers, at least one of the rollers being provided a roller journal seated in a mounting element by way of a bearing arrangement that includes a bearing;

at least one sensor mounted in the bearing arrangement or the mounting element which monitors a value of a process quantity at the bearing or the mounting element;

conducting means for conducting the monitored value of the process quantity from the at least one sensor;

comparing means for comparing the monitored value of the process quantity with a stored preset value; and means for triggering a signal when the monitored value exceeds or falls below the stored preset value.

17. The device in accordance with claim 16, wherein the sensor is a force sensor.

18. The device in accordance with claim 16, wherein the sensor is a moisture sensor.

19. The device in accordance with claim 16, wherein the sensor is a temperature sensor.

20. The device in accordance with claim 16, wherein the sensor is a deformation sensor.

21. The device in accordance with claim 16, wherein the sensor is a wire strain gauge.

22. The device in accordance with claim 16, wherein the sensor is a velocity sensor or acceleration sensor.

23. The device in accordance with claim 16, wherein the bearing is a rolling bearing.

24. The device in accordance with claim 16, wherein the bearing is a multi-row tapered roller bearing.

25. The device in accordance with claim 16, wherein the bearing is a multi-row tapered roller bearing.

26. The device in accordance with claim 16, wherein the bearing is a multi-row cylindrical roller bearing.

27. The device in accordance with claim 16, wherein the conducting means transmits the monitored value of the process quantity in a wireless manner.

* * * * *